United States Patent [19]

Leopold

[11] Patent Number: 5,523,935
[45] Date of Patent: Jun. 4, 1996

[54] AC/DC VOLTAGE CONVERTER

[76] Inventor: Hans Leopold, Sonnleitenweg 17, A-8043 Graz, Austria

[21] Appl. No.: 53,768

[22] Filed: Apr. 29, 1993

[30] Foreign Application Priority Data

Apr. 29, 1992 [AT] Austria .................................. A 885/92

[51] Int. Cl.⁶ .............................. H02M 3/335; G05F 1/10
[52] U.S. Cl. .............................. 363/16; 323/222; 323/908
[58] Field of Search ..................... 323/222, 259, 323/282, 344, 908; 363/16; 361/10, 126

[56] References Cited

U.S. PATENT DOCUMENTS

| | | | |
|---|---|---|---|
| 4,455,598 | 6/1984 | Andre | 363/87 |
| 4,792,887 | 12/1988 | Bernitz et al. | 323/222 X |
| 5,019,952 | 5/1991 | Smolenski et al. | 363/16 |
| 5,187,653 | 2/1993 | Lorenz | 363/89 |

FOREIGN PATENT DOCUMENTS

| | | |
|---|---|---|
| 0431778 | 6/1991 | European Pat. Off. . |
| 4224796 | 2/1993 | Germany . |

Primary Examiner—Peter S. Wong
Assistant Examiner—E. To
Attorney, Agent, or Firm—Cushman, Darby & Cushman

[57] ABSTRACT

An AC/DC voltage converter achieving a relatively low loss of power includes a rectifier circuit connected directly to a step-up converter circuit. The voltage converter further includes a storage capacitor and a resistor connected to outputs of the step-up converter circuit. One electrode of the storage capacitor is connected through the resistor to one output of the step-up converter circuit.

6 Claims, 3 Drawing Sheets

5,523,935

AC/DC VOLTAGE CONVERTER

BACKGROUND OF THE INVENTION

1. Field of the Invention

The present invention relates to an AC/DC voltage converter, and more specifically, to an AC/DC voltage converter including a rectifier circuit connected to the inputs of a step-up converter circuit and a storage capacitor and a resistor connected to the outputs of the step-up converter circuit.

2. Description of the Related Art

In conventional voltage converters, a storage capacitor is connected directly to the outputs of a step-up converter circuit, while a resistor is either connected between one output of a rectifier circuit and one input of the step-up converter circuit or is connected to an input of the rectifier circuit.

The step-up converter circuit in such conventional voltage converters typically includes an inductor, an electronic switch and a diode or another switch. The switch in the step-up converter circuit permits actively influencing the time variation of the input current of the rectifier circuit. The rectifier circuit is preferably formed by a rectifier bridge. The pulse duty ratio of the switch is controlled such that the mean value of the input current of the rectifier circuit is proportional to the input voltage. This gives an essentially sinusoidal variation of the current. The resistor is necessary because the step-up converter circuit operates only when the output voltage at the storage capacitor is higher than the input voltage of the rectifier. Thus, the resistor limits the current during start-up, as the step-up converter can only work properly if the output voltage across the storage capacitor is larger than the input voltage to the rectifier. However, the input current flows through the resistor regardless of the position of the switch in the step-up converter. This leads to a correspondingly high power loss in the voltage converter.

FIG. 1 (PRIOR ART) shows a circuit arrangement for a conventional AC/DC voltage converter. The voltage converter includes a rectifier circuit 11, a resistor 5, a step-up converter circuit 12, and a storage capacitor 9. Rectifier circuit 11 includes two input terminals 13 and 14 and two output terminals 15 and 16. Step-up converter circuit 18 also includes two input terminals 17 and 18 and two output terminals 19 and 21. A.C. voltage source 20 is connected to the two input terminals 13 and 14 of rectifier circuit 11 and delivers an input voltage $V_i$ which produces an input current $I_i$ through rectifier circuit 11. Rectifier circuit 11 includes four diodes 1, 2, 3 and 4 disposed in a bridge circuit. Rectifier circuit 11 is connected to step-up converter circuit 12 through resistor 5. Output terminal 15 of rectifier circuit 11 is connected to an input of resistor 5, and an output of resistor 5 is connected to input terminal 17 of step-up converter circuit 12. Terminals 16 and 18 are directly connected to each other.

Step-up converter circuit 12 includes an inductor 6, a high-frequency switch 7, and a diode 8. Switch 7 connects inductor 6 with output terminal 16 of rectifier circuit 11. Diode 8 is connected to output terminal 19 of step-up converter circuit 12. The two output terminals 19 and 21 of step-up converter circuit 12 are connected to storage capacitor 9, across which an output voltage $V_o$ can be tapped, and which drives a load current $I_o$ to load 30. While switch 7 is closed, the current in inductor 6 increases, magnetic energy is stored in inductor 6, and diode 8 is off. If switch 7 is opened, the voltage across switch 7 increases until it surpasses the voltage across capacitor 9. Diode 8 starts to conduct the current stored in the inductor into storage capacitor 9. If the pulse duty-ratio of switch 7 is 0.5, i.e., the on-time and off-time of the switch are equal, then $V_o$ will equal $2V_i$. This conventional voltage converter, however, produces a relatively high power loss.

SUMMARY OF THE INVENTION

It is therefore an object of this invention to provide an AC/DC voltage converter which achieves a very low loss of power.

This object is achieved by providing an AC/DC voltage converter which includes a rectifier circuit having two input terminals and two output terminals, a step-up converter circuit having two input terminals and two output terminals, a resistor, and a storage capacitor. An AC voltage source is connected to the two input terminals of the rectifier circuit. The two output terminals of the rectifier circuit are connected to the two input terminals of the step-up converter circuit. One electrode of the storage capacitor is connected through the resistor to one output terminal of the step-up converter circuit. The other electrode of the storage capacitor is connected to the second output terminal of the step-up converter circuit.

The structure of the present invention allows the input current of the rectifier circuit to flow through the resistor only during the time in which the switch of the step-up converter circuit is open. If the pulse duty ratio of the switch in the step-up converter is 0.5, the dissipated power loss across the resistor drops by half that of the power loss occurring in conventional devices.

The above object is also achieved by providing a second capacitor in the AC/DC voltage converter of the present invention. The two output terminals of the step-up converter circuit are connected to the second capacitor. The storage capacitor is connected in parallel to the second capacitor, with the resistor connected in series between the two capacitors.

This structure provides a further reduction of power loss. The high-frequency ripple of the output current of the step-up converter circuit is filtered by the second capacitor before entering the resistor. The resistor is therefore loaded only by the low-frequency transformed input current, the RMS value of which is smaller than that of the unfiltered output current of the step-up converter circuit. Because of the high switching frequency, the capacitance of the second capacitor can be orders of magnitude smaller than that of the storage capacitor.

Furthermore, due to the reduced power loss, the resistor can produce such a high value, allowing the converter to withstand a transient voltage given in the VDE (Association of German Electricians) 0160 standard. As a result, the permissible operating voltage of the storage capacitor and the power loss in the resistor will remain within safe limits.

BRIEF DESCRIPTION OF THE DRAWINGS

This and other objects and advantages of the present invention will become apparent and more readily appreciated from the following description of the presently preferred exemplary embodiments, taken in conjunction with the accompanying drawings, of which.

DETAILED DESCRIPTION OF THE PRESENTLY PREFERRED EMBODIMENTS

Figure 1:
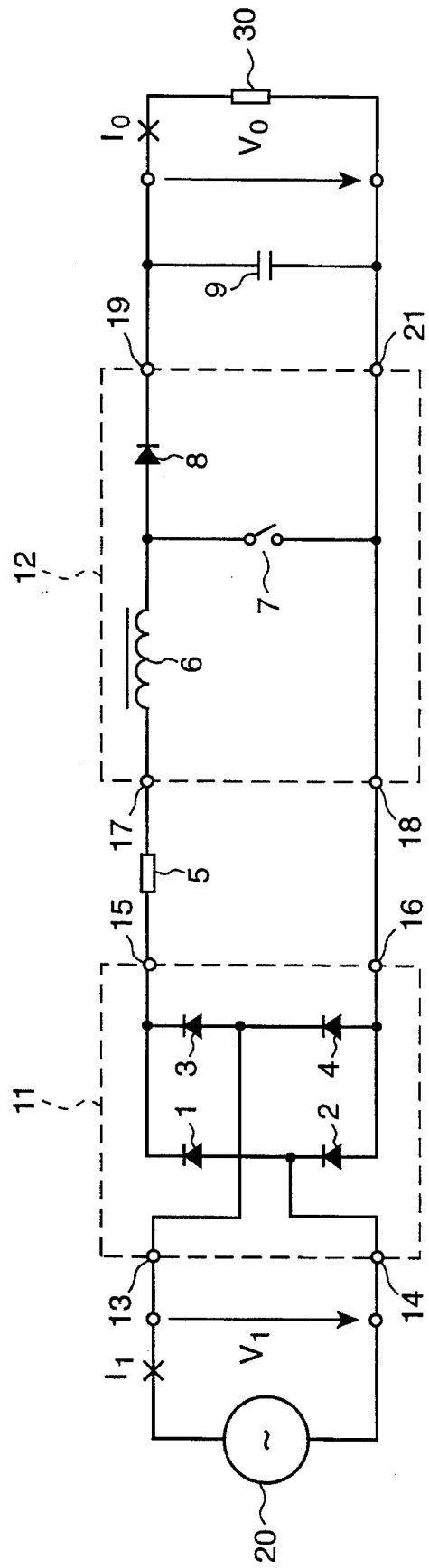
FIG. 1 (PRIOR ART) is a circuit diagram of a conventional AC/DC voltage converter.
Figure 2:
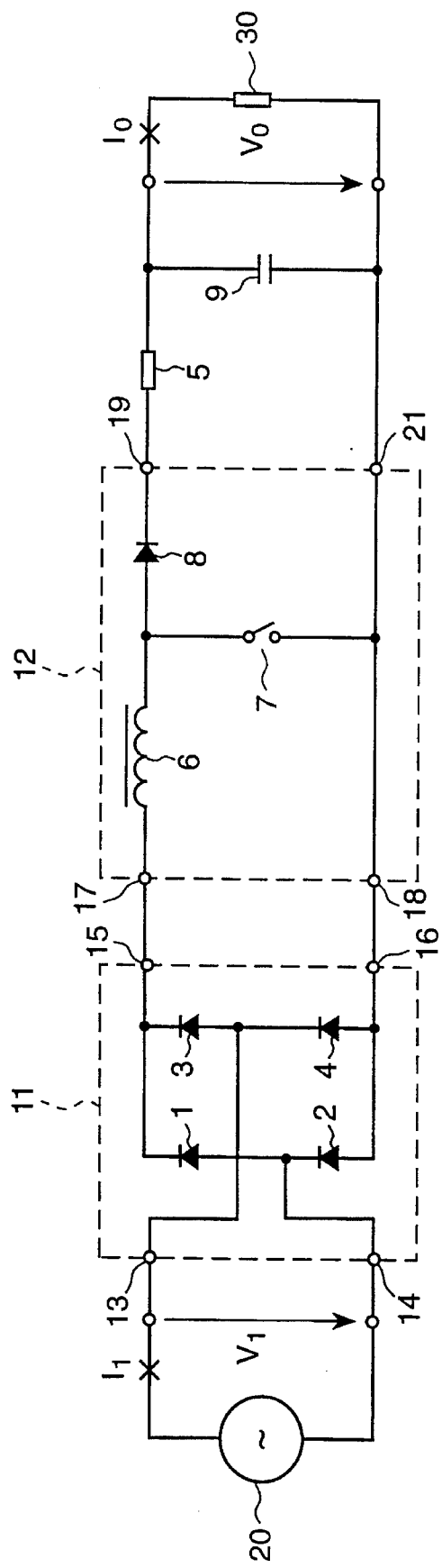
FIG. 2 is a circuit diagram of an AC/DC converter in accordance with a first embodiment of this invention.

FIG. 2 shows a first embodiment of an AC/DC converter in accordance with the present invention. The AC/DC voltage converter is similar to the prior art illustrated in FIG. 1, except that resistor 5 is connected to the output of step-up converter circuit 12. Rectifier circuit 11 and step-up converter circuit 12 are directly connected to each other; terminals 15 and 17 are directly connected to each other and terminals 16 and 18 are directly connected to each other. Resistor 5 is connected between output terminal 19 of step-up converter circuit 12 and one electrode of storage capacitor 9. The other electrode of storage capacitor 9 is connected to output terminal 21 of step-up converter circuit 12.

Figure 3:
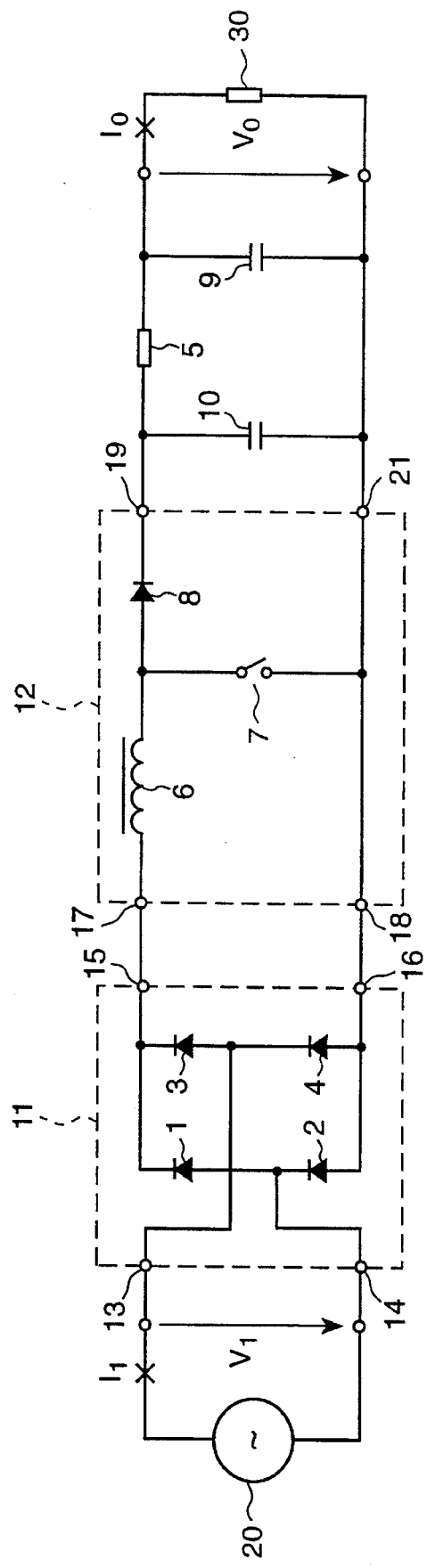
FIG. 3 is a circuit diagram of an AC/DC converter in accordance with a second embodiment of this invention.

FIG. 3 shows a second embodiment of an AC/DC converter in accordance with the present invention. FIG. 3 is identical to FIG. 2, except that FIG. 3 includes another capacitor 10. Capacitor 10 is connected across output terminals 19 and 21 of step-up converter circuit 12 and in parallel with storage capacitor 9. Resistor 5 is connected in series between capacitors 10 and 9.

Switch 7 in FIG. 2 and in FIG. 3 can be pulsed at 100 kHz, for example. In the converter embodiment of FIG. 2, if the pulse duty ratio of switch 7 is 0.5, for example, the power loss occurring across resistor 5 is reduced by a factor of two as compared to the conventional converter illustrated in FIG. 1. The current through resistor 5 will flow during 5 μsec in a 10 μsec switching period. This power savings is particularly large when the circuit according to FIG. 2 is used in a wide range of power supply, which generates a constant DC-voltage of about 400 V from AC-input voltages ranging between 90 and 264 $V_{RMS}$. At low power line voltages, the high input current flows only during a small fraction of the switching period through resistor 5. The average value of the current through the resistor 5 remains small and independent of the power-line voltages.

In the embodiment according to FIG. 3, a further reduction of the power loss across resistor 5 is achieved, since the high-frequency ripple of the output current $I_o$ of step-up converter 12 is filtered by the surge-proof capacitor 10 before entering resistor 5. Capacitor 10 is immune to switching processes because it is switched directly to the power line without a current limiting resistor. Thus, only the low-frequency transformed input current showing a smaller RMS value than the unfiltered output current of step-up converter 12 dissipates power in resistor 5. Furthermore, at low power-line voltages, the pulse duty ratio is larger than 0.5, and current flows through resistor 5 if the switch is open (according to FIG. 2). However, in FIG. 3, no 100 kHz current flows through resistor 5; it flows through capacitor 10 where no dissipation is possible because capacitor 10 is purely reactive (not resistive). Thus, the power loss across resistor 5 is smaller by a factor of about 16 in the converter embodiment of FIG. 3 as compared with that of FIG. 1, for a wide input range of power.

Although a few preferred embodiments of this invention have been shown and described, it will be appreciated by those skilled in the art that changes may be made in these embodiments without departing from the principles and the spirit of the invention, the scope of which is defined in the appended claims.

What is claimed is:

1. An AC/DC voltage converter comprising:

a rectifier circuit having an output;

a step-up converter circuit having an input and an output, said input of said step-up converter being connected to said output of said rectifier circuit;

a current limiting resistor connected in series with said output of said step-up converter circuit, a first node at a first end of said current limiting resistor being connected to said output of said step-up converter circuit, and a second node being defined at a second end of said current limiting resistor, wherein said first node has no paths to ground which require high current flow at circuit start-up; and a storage capacitor connected to said second node of said current limiting resistor to receive said output of said step-up converter circuit through said current limiting resistor.

2. The voltage converter as claimed in claim 1, wherein said output of said step-up converter circuit includes a first output terminal and a second output terminal, and wherein said storage capacitor has a first electrode connected through said current limiting resistor to said first output terminal of said step-up converter circuit and a second electrode of said storage capacitor is connected to said second output terminal of said step-up converter circuit.

3. The voltage converter as claimed in claim 1, further comprising an output terminal, connected to said second node of said current limiting resistor, and a resistor connected in parallel across said storage capacitor, between said second node and ground.

4. An AC/DC voltage converter comprising:

a rectifier circuit including a plurality of rectifier diodes and a rectifier output terminal;

a step-up converter circuit including a converter input terminal connected to said rectifier output terminal, a converter output terminal, an inductor operatively connected to said converter input terminal, a diode operatively between said inductor and said converter circuit output terminal, and an electronic switching device having a first terminal operatively connected between said inductor and said diode;

a current limiting resistor having a first resistor node at a first end thereof and a second resistor node at a second end thereof, said first resistor node being operatively connected to said converter output terminal such that said current limiting resistor is connected in parallel with said electronic switching device, wherein said first resistor node has no paths to ground which require high current flow at circuit start-up; and a storage capacitor having a capacitor terminal connected to said second resistor node to receive an output of said step-up converter circuit through said current limiting resistor.

5. The AC/DC voltage converter as claimed in claim 4, further comprising a surge-proof capacitor having a terminal connected to said converter output terminal such that said surge-proof capacitor is connected in parallel with said step-up converter circuit.

6. The AC/DC voltage converter as claimed in claim 4, wherein said electronic switching device controls a current flowing through said current limiting resistor.

* * * * *